(12) United States Patent
Chin et al.

(10) Patent No.: US 9,083,461 B2
(45) Date of Patent: Jul. 14, 2015

(54) LOCALISATION OF ELECTRONIC EQUIPMENT

(75) Inventors: Woon Hau Chin, Bristol (GB); Mahesh Sooriyabandara, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 13/978,663

(22) PCT Filed: Jan. 7, 2011

(86) PCT No.: PCT/GB2011/000017
§ 371 (c)(1),
(2), (4) Date: Sep. 6, 2013

(87) PCT Pub. No.: WO2012/093241
PCT Pub. Date: Jul. 12, 2012

(65) Prior Publication Data
US 2013/0336660 A1    Dec. 19, 2013

(51) Int. Cl.
*H04B 10/00* (2013.01)
*H04B 10/116* (2013.01)
*G01S 1/70* (2006.01)
*H04B 10/114* (2013.01)

(52) U.S. Cl.
CPC ............... *H04B 10/116* (2013.01); *G01S 1/70* (2013.01); *H04B 10/114* (2013.01)

(58) Field of Classification Search
CPC ............ H04B 10/112; H04B 10/1123; H04B 10/114; H04B 10/1143; H04B 10/116; H04B 10/1149; G01S 1/70
USPC .......................... 398/118, 126–128, 135, 172
See application file for complete search history.

(56) References Cited

U.S. PATENT DOCUMENTS

| 7,405,390 | B2 * | 7/2008 | Sano et al. ..................... 250/221 |
| 7,970,537 | B2 * | 6/2011 | Ann et al. ....................... 701/434 |
| 2002/0071161 | A1 | 6/2002 | Perkins et al. |
| 2002/0089722 | A1 | 7/2002 | Perkins et al. |
| 2007/0177161 | A1 | 8/2007 | Ishii et al. |
| 2009/0171571 | A1 * | 7/2009 | Son et al. ....................... 701/208 |
| 2010/0129087 | A1 * | 5/2010 | Kim et al. ..................... 398/182 |
| 2010/0322635 | A1 | 12/2010 | Klinghult |

FOREIGN PATENT DOCUMENTS

| EP | 1 732 247 | 12/2006 |
| JP | 2008-14776 A | 1/2008 |

(Continued)

OTHER PUBLICATIONS

Office Action issued Sep. 16, 2014 in Great Britain Patent Application No. GB1312149.6.

(Continued)

*Primary Examiner* — Dalzid Singh
(74) *Attorney, Agent, or Firm* — Oblon, McClelland, Maier & Neustadt, L.L.P.

(57) ABSTRACT

Localization of an electronic device is enabled by establishing a localization environment wherein sources of visible light are configured to modulate onto emitted light a detectable signal, each signal bearing information identifying that light source, such that light incident on a device can be processed to identify particular sources of incident light and therefrom the location of the device.

9 Claims, 5 Drawing Sheets

(56) References Cited

FOREIGN PATENT DOCUMENTS

| | | |
|---|---|---|
| JP | 2010-261896 A | 11/2010 |
| KR | 2010 0068683 | 6/2010 |
| WO | 02/47292 | 6/2002 |
| WO | WO 02/47292 A1 | 6/2002 |
| WO | WO 2005/086375 A1 | 9/2005 |
| WO | WO 2005086375 A1 * | 9/2005 |

OTHER PUBLICATIONS

Office Action issued Jan. 13, 2015 in Japanese Application No. 2013-547901 (with English language translation).

Office Action issued Jun. 17, 2014 in Japanese Patent Application No. 2013-547901 (with English language translation).

International Search Report Issued Sep. 28, 2011 in PCT/GB11/000017 Filed Jan. 7, 2011.

* cited by examiner

LOCALISATION OF ELECTRONIC EQUIPMENT

FIELD

Embodiments described herein relate to localisation of electronic equipment.

BACKGROUND

Localisation is often implemented by use of radio frequency (RF) communication. This habitually involves the communication of location codes to a central processing device, or local usage of RF signals to locate the geographical position of the device (for example, by triangulation from beacons with known positions). However, in some situations, RF may not be the most appropriate medium. This is because RF spectrum is finite, and thus access thereto is controlled by regulation. Access to many bands in the RF spectrum can involve payment of expensive licence fees to a regulator. Thus, allocation of spectrum for localisation purposes is not always possible. In such circumstances, licence free bands can be defined and used, but these tend to be crowded and may not provide the best means of communication.

DETAILED DESCRIPTION

Visible light communication is a relatively new mode of communication employing visible light to transmit large amounts of data from a light source to a sensor. This is normally accomplished using a light emitting diode (LED) which is able to cope with a high frequency modulating signal. Use of a high frequency modulating signal is desirable so that the modulations are invisible to the naked eye.

Such communication techniques are described in International Patent Application WO2008/148039A1, in "Fundamental analysis for visible-light communication system using LED lights," (Komine, T.; Nakagawa, M.; IEEE Transactions on Consumer Electronics, vol. 50, no. 1, pp. 100-107, February 2004), and in "Indoor visible light communications: challenges and prospects," (D. O'Brien, M. Hoa Le, Z. Lubin, F. Grahame, L. Kyungwoo, J. Daekwang, O. YunJe, and W. Eun Tae, SPIE Optics and Photonics 2008, p. 709106).

Visible light communication is useful in circumstances where an array of LEDs is already available, such as in offices and buildings. In such cases, the power supply of these lights can be modulated to transmit data. A light sensor would be able to decode the light signals into useful data.

In localisation, visible light communications can be useful for devices, such as robots, for self-location in a building. As the device only needs to know its own location, and this information does not need to be fed back to another control device, visible light communication is appropriate for this application.

According to one embodiment, a device localisation system comprises a plurality of visible light emitting means, each operable to emit light at least in part in the visible spectrum, and onto which is modulated a signal bearing information to enable one visible light emitting means to be distinguished from others.

According to another embodiment, a device comprises light receiving means operable to receive light incident thereon, signal information detection means operable to detect information modulated onto a light signal incident on said light receiving means, said information characterising a source of said light signal, and location determining means operable to determine location information on the basis of said information modulated onto said light signal.

Figure 1:
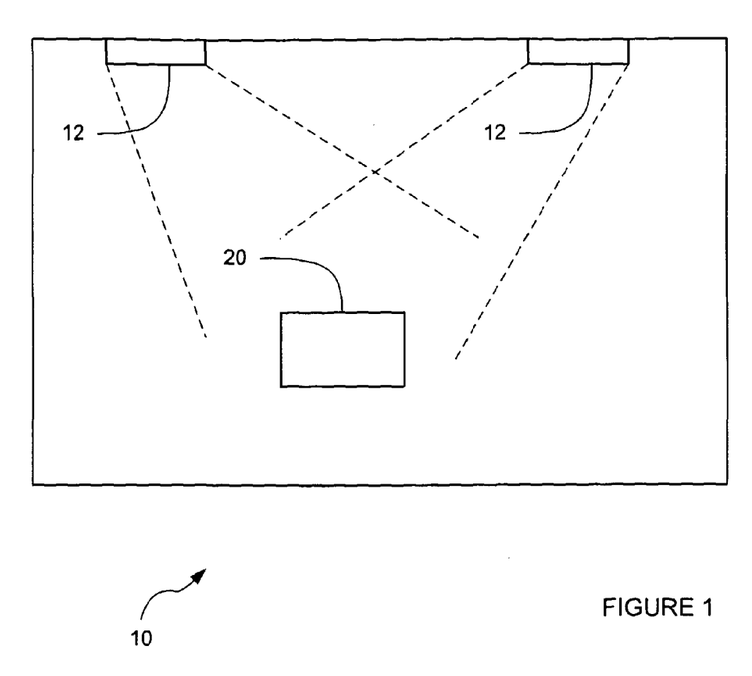
FIG. 1 is a schematic diagram of a working environment including a communications system employing localisation in accordance with a described embodiment.

The specific embodiment as illustrated in FIG. 1 of the drawings comprises a user device 20 in an environment comprising a room 10 with ceiling lighting units 12. As illustrated, light (as indicated by the broken lines) is emitted by the lighting units, at least in part incident on the user device 20.

Figure 2:
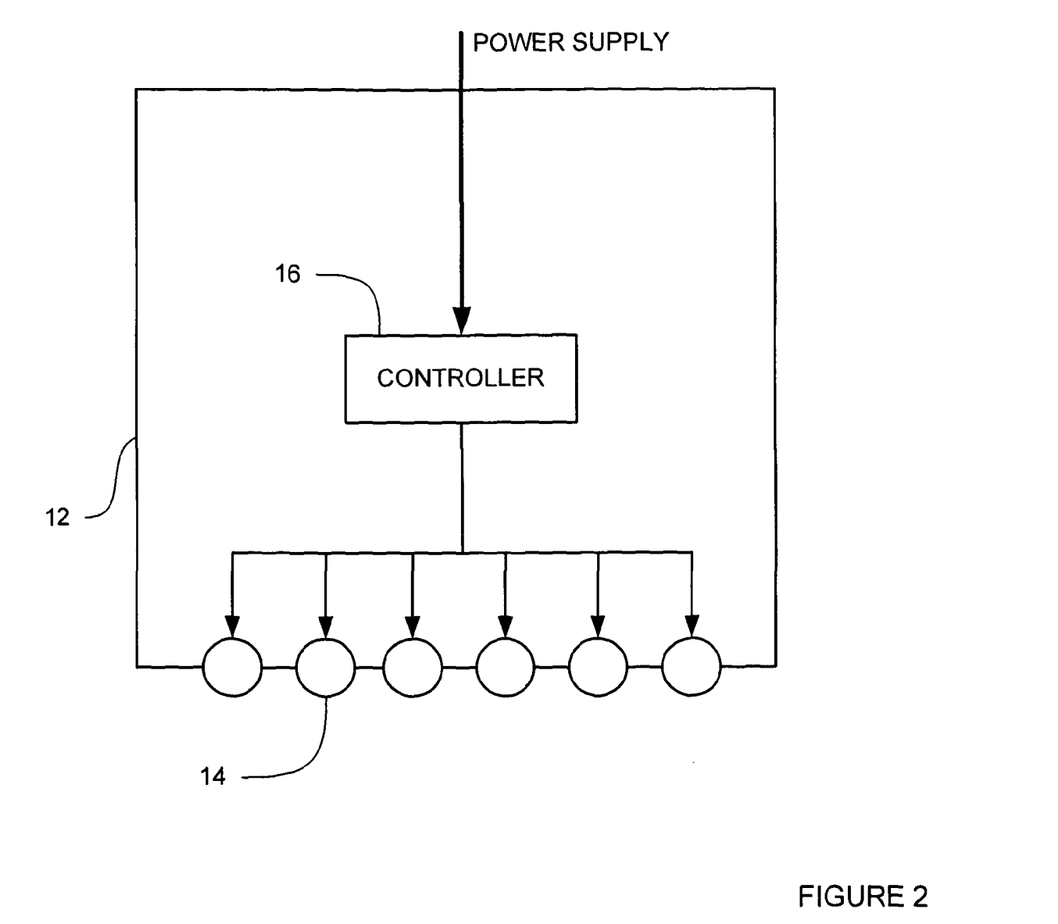
FIG. 2 is a schematic diagram of a lighting unit of the described embodiment.

One of the lighting units 12 is illustrated in more detail, and schematically, in FIG. 2. Each ceiling lighting unit 12 comprises an array of LEDs 14 (six are illustrated here but that is not necessarily an indicative number, and a controller 16. The controller 16 is operable to impart on the LEDs 14 in its lighting unit 12 a power supply signal at a voltage modulated by a modulation signal bearing a identifier code unique to that lighting unit 12.

In one arrangement, the ceiling lighting units 12 are connected to a central controller (not shown) by any useful means of communication. One possible means of communication is power line communication. Connection to a central connection in this way may be useful to enable central coordination of operations.

Each lighting unit 12 thus transmits, on a visual light carrier beam, a unique identifier code associated with it, by which the user device 20, in receipt of the modulated transmitted light, can determine its own location.

While the word "unique" is employed above, the reader will appreciate that it is sufficient, in an embodiment, for an identifier code to be such that a particular lighting unit can be distinguished from neighbours. For instance, if a handheld device is for use entirely within a particular locality, it is enough that identifier codes are not re-used within that locality. Moreover, identifier codes can be re-used within a locality if the manner of re-use is such that combinations of identifier codes which can be encountered are not repeated within a locality. This recognises that, if the identifier codes of several lighting units are received at a particular device then if each lighting unit has a unique identifier code then there is an inherent redundancy of information.

Put simply, if an identifier code "A" is encountered with identifier codes "B" and "C", then this can only be a lighting unit with identifier code "A" neighbouring lighting units with identifier codes "B" and "C". If identifier code "A" is used more than once in a particular implementation, but only once in the neighbourhood of lighting units with identifier codes "B" and "C", then the lighting unit with identifier code "A" in the neighbourhood of lighting units with identifier codes "B" and "C" can be identified unambiguously.

Thus, although an identifier code might not, in itself, be sufficient to identify a particular lighting unit, the encounter of that identifier code alongside others of neighbouring lighting units will resolve any ambiguity.

Figure 3:
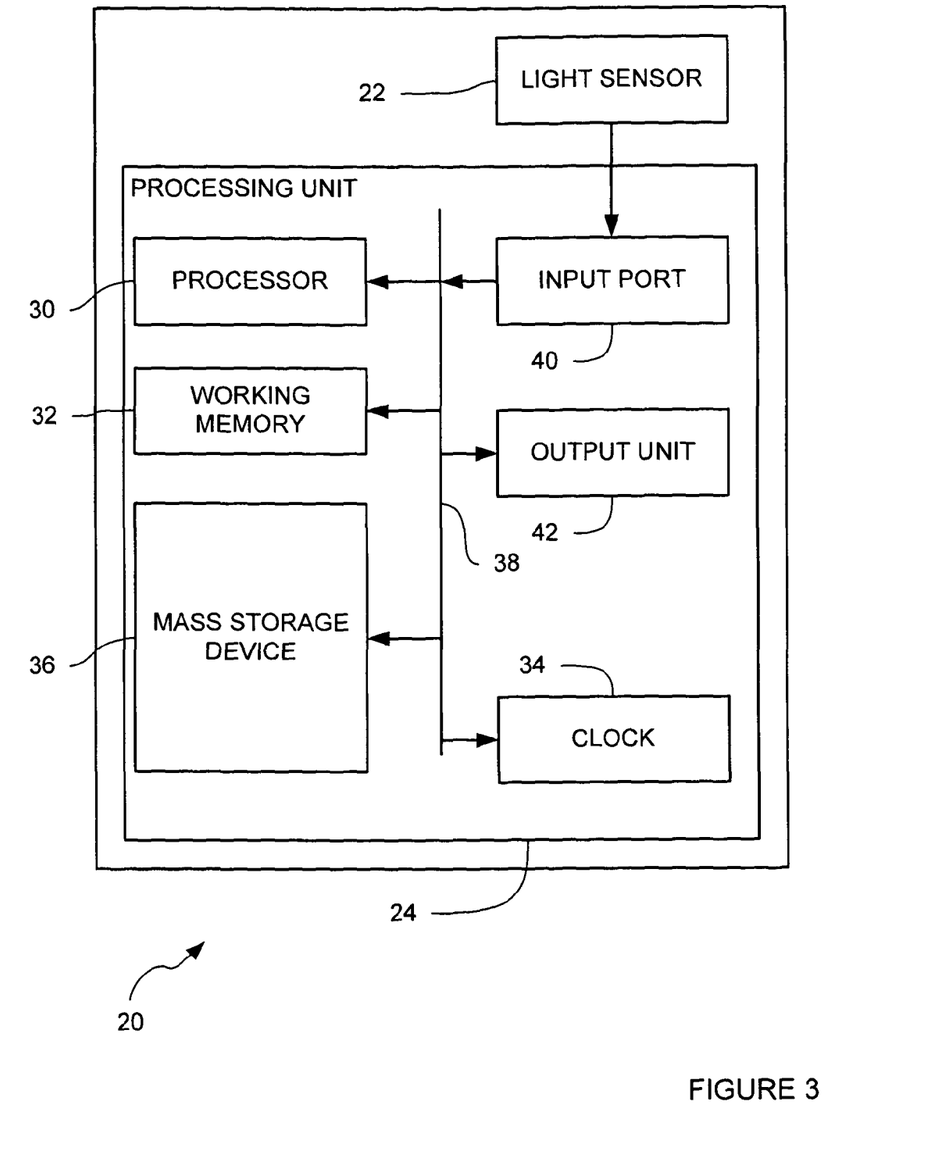
FIG. 3 is a schematic diagram of a user device of the described embodiment.
Figure 4:
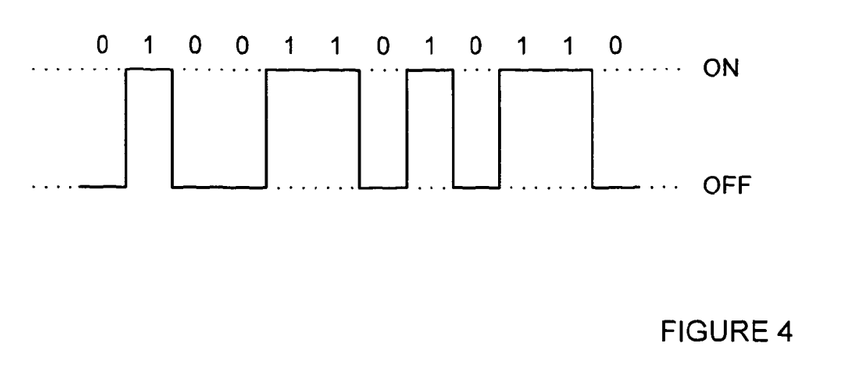
FIG. 4 is a graph illustrating an example of a localisation signal used in the described embodiment.

As illustrated in FIG. 3, the user device 20 comprises a light sensor 22 and a processing unit 24. The processing unit 24 comprises a processor 30, a working memory 32, a clock 34, and a mass storage device 36. A bus 38 enables data communication within the processing unit 24. An input port 40 enables reception of a signal from the light sensor 22, and an output unit 42 provides a facility for outputting information to a user.

The reader will appreciate that the user device 20 may include further features in order to achieve a desired user experience, such as a keypad, screen, audio output device, or the like; only those features relevant to the present embodiment are disclosed herein.

Thus, each lighting unit 12 is located in a distinct geographical location. Information describing geographical locations of lighting units 12, and the unique identifier codes assigned to the lighting units 12, is recorded in a database which is stored in the mass storage device 36 of the processing unit 24. The identifier codes are, in this embodiment, pre-agreed.

If changes are made to the information describing geographical locations and unique identifiers of lighting units, for instance if a lighting unit is removed, or another lighting unit is installed, or if a lighting unit is moved or found to be faulty, then this information can be imparted to a user device by an update of this information. This update could be sought by a user device on the basis of user input action, such as is the case with "apps" currently in use by smartphones, or by "pushing" the update to the user device without the user having to initiate a process.

In an alternative, the identifier codes could be hard-coded into the user device. In such a case, there would be no facility for changing the information after installation—this could be useful if the risk of tamper with important information outstrips the benefit of providing a facility for such information to be edited after installation.

In use, the light sensor 22 of the user device will receive transmitted light signals from nearby lighting units 12. It will be understood by the reader that a user device might be subject to incident light from numerous lighting units simultaneously, but that it may be that only a subset of these incident light beams is at a useful intensity so that information modulated thereon is detectable by the user device.

If light from only one lighting unit 12 is received at the light sensor 22 at sufficient power that the corresponding transmitted identifier code is discernable, the signal passed from the light sensor 22 to the processing unit 24 will be characteristic of the modulated identifier code on the light emitted by that active lighting unit 12. The user device 20 will estimate the code from the signal and the processing unit 24 can identify the position of the device by looking up the location associated with the code in the database stored in the mass storage device 36. A process of estimation of the code will be described in due course.

Of course, the user device 20 will only, in such circumstances, be able to determine that it is in line of sight of a particular lighting unit. It will not be able to establish its position relative to that lighting unit, as more information would be required in order to do that.

If the light from multiple lighting units 12 is received at the user device at sufficient power to allow the relevant modulated information to be detected, the user device 20 will follow a procedure as outlined below to ascertain its location.

Modulation at the Lighting Unit

Figure 5:
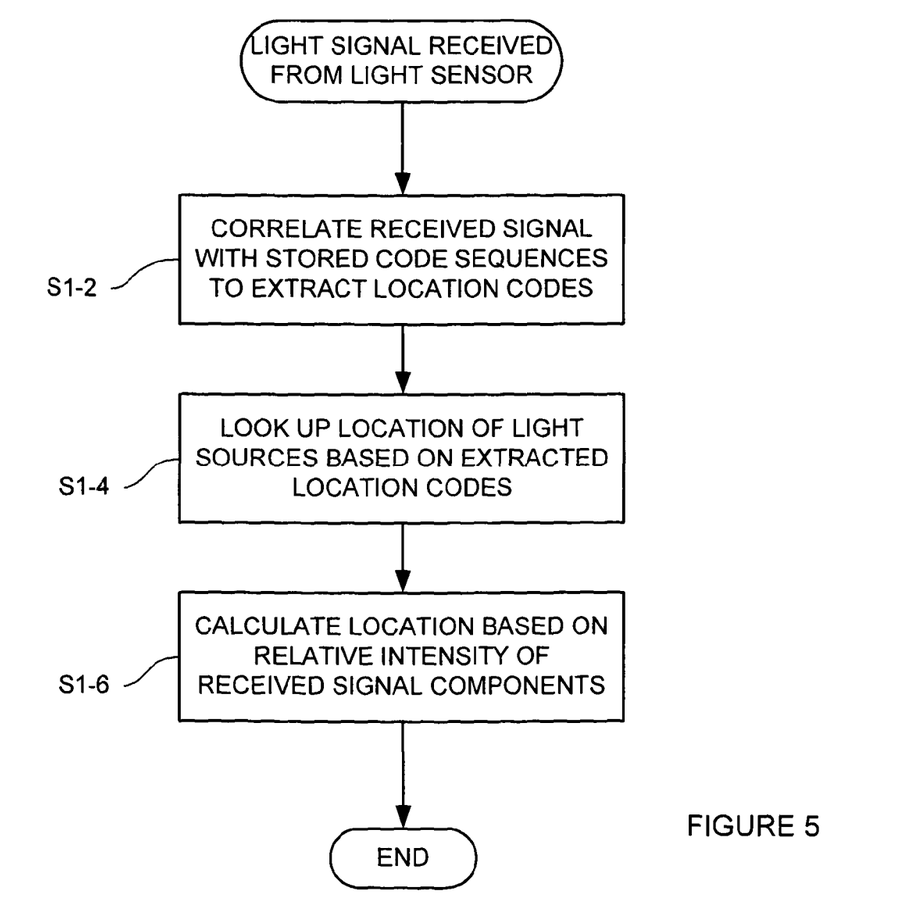
FIG. 5 is a flow diagram of a process carried out at the user device.

The light emitted by a lighting unit 12 is, in this embodiment, modulated using one of a number of possible modulation schemes. FIG. 5 illustrates On-Off keying, but other schemes are available, such as biphase modulation. The means of modulation can be applied either to the power supply of the lighting unit 12 or contained within the lighting unit 12 itself. The reader will appreciate that modulation of a light emission is easily implemented by commonly available electronic components.

Each identifier code used by each of the lighting units 12 in this embodiment is unique and associated with its geographical location. That is, a geographical coordinate system forms the basis for the definition of identifier codes. The identifier codes should also have properties which would allow it to be differentiated in situations where several lighting units are present. Examples of such codes are orthogonal codes, m-sequences, and gold codes. Orthogonal codes have a particular advantage in that implementation thereof is relatively straightforward.

Reception and Decoding

Figure 6:
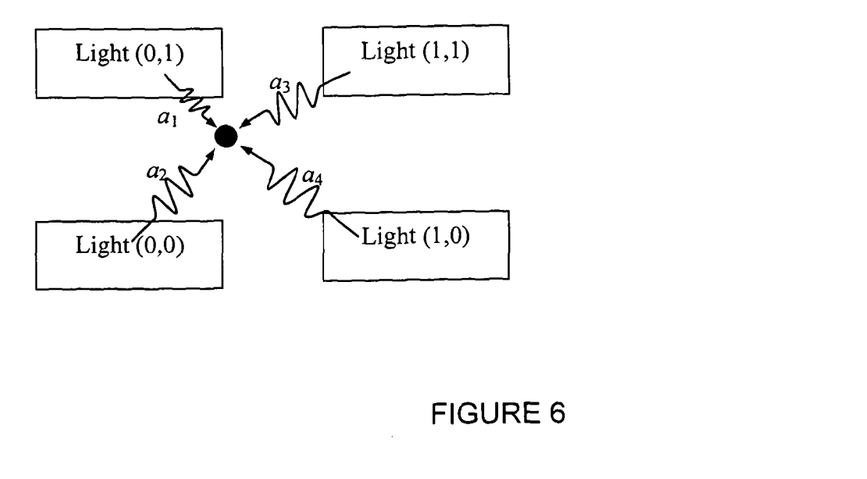
FIG. 6 is a schematic diagram of an example of localisation using the described embodiment.

At the user device 20, in a contemplated embodiment, it can be expected that a signal generated at light sensor 22 (hereinafter referred to as a lighting signal) will comprise a composite signal consisting of components from multiple lighting units and noise. Some of these components will be from lighting units 12 in accordance with the described embodiment, but it is possible that not all of them will be. An example of such a signal is $$r = a_1 s_1 + a_2 s_2 + a_3 s_3 + n,$$

where $s_k$ are the signals from different lighting units, $a_k$ are their respective intensities, and n is the ambient light, such as from natural sources (e.g. the sun) or from other electrical sources not in accordance with the described embodiment. n may vary with time. It is expected that, in an implementation of the embodiment, n cannot, strictly speaking, be ignored, but can be assumed to be constant for a relatively short period of time. FIG. 6 illustrates this pictorially, for four lighting units.

FIG. 5 illustrates a flow diagram of a process carried out by the processor to determine location from the received lighting signal. This process, and any other disclosed herein, can be configured by way of computer implementable instructions in the form of a computer software product (such as a storage device or a signal borne program download), or by way of an application specific implementation such as a DSP or FPGA.

To extract the codes from the different lighting units, the received signal r will be correlated in step S1-2 with all of the different sequences stored in the database. The result of correlation will also include a measure of light intensity of the component of the lighting signal attributable to the detected sequence in question.

In step S1-4, the resultant detected sequences are then looked up against entries in the database to determine the locations of the respective lighting units 12.

In step S1-6, to determine the exact location of the device, the distance of each lighting unit from the device is calculated as the square root of the light intensity associated with each lighting unit multiplied with a calibration factor. This calibration factor can be determined heuristically, that is, by trial and error.

An example of the calculation carried out at step 1-6 will now be described, for a case where N lighting units emit light detectable at the user device 20.

Step 1

Firstly, the three components of the light signal with highest magnitude are chosen; for the kth highest magnitude component, the location of the corresponding lighting unit 12 is denoted as $(x_k, y_k)$ in Cartesian coordinates.

The distance of the user device from each of these lighting units is denoted as $d_1$, $d_2$, and $d_3$ respectively.

Step 2

The coordinates are transformed such that $$\bar{x}_1 = 0, \bar{y}_1 = 0,$$
$$\bar{x}_2 = (x_2 - x_1)\cos\theta - (y_2 - y_1)\sin\theta,$$
$$\bar{y}_2 = (x_2 - x_1)\sin\theta + (y_2 - y_1)\cos\theta,$$
$$\bar{x}_2 = (x_2 - x_1)\cos\theta - (y_2 - y_1)\sin\theta,$$
$$\bar{y}_2 = (x_2 - x_1)\sin\theta + (y_2 - y_1)\cos\theta,$$

and $$\theta = \tan^{-1}\frac{y_2 - y_1}{x_2 - x_1}.$$

Step 3

The corresponding transformed x coordinate of the user device 20 in the transform domain is calculated as $$x = \frac{d_1^2 - d_2^2 + \bar{x}_2^2}{2\bar{x}_2},$$

and its corresponding y coordinate is $$y = \frac{d_1^2 - d_3^2 + \bar{x}_3^2 + \bar{y}_3^2}{2y_3} - \frac{\bar{x}_3}{\bar{y}_3}x.$$

The coordinates of the device are then transformed back into Cartesian coordinates using an inverse of the transformation applied in step 2.

It will be appreciated from the foregoing that the manner of implementation of a described embodiment can be by the provision of hardware, or software or a mixture of both. If software implementation is contemplated, this could be by way of a complete program, executable by an appropriately computerised device, or by way of software components configured to cooperate with software components assumed to be already present on a computing device, such as an operating system or a library of functions.

Software can be introduced to a device as illustrated in FIG. 3 by way of a wireless communications channel, via an antenna and a suitable communications driver (not shown, for ease of illustration) or via a storage medium such as a memory card, a mass storage device, or a direct connection to a PC (such as when a smartphone is periodically updated by connection to a home PC).

While the above embodiment sets objectively out the features and characteristics of an embodiment using visible light, it may also be useful to compare the same with an RF implementation in accordance with previous examples. Using RF for localisation will require installation of RF transceivers at different locations in a coverage area, to facilitate communication with a user device for positioning purposes. On the other hand, since lighting units are habitually installed in buildings (at least to the most part), they are in situ and, with little additional equipment, they can be easily used to send position identifier codes to the device.

Using RF technologies for localisation also has an added drawback of interference. As mentioned previously, RF technologies often use unlicensed bands for communication, and unlicensed bands are usually extremely crowded, especially in bands such as the ISM bands. In contrast, visible light communication such as described above will not, in a particular embodiment, unduly exhibit this problem of interference, since it would be unlikely for another lighting unit, not configured in accordance with the embodiment, to interfere with the lighting units so configured.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

The invention claimed is:

1. A device comprising:
   light receiving means operable to receive, from each one of a plurality of visible light emitting means, a respective light signal at least in part in the visible spectrum, each light signal being modulated with an identifier code to enable one visible light emitting means to be distinguished from others,
   signal information detection means operable to detect the respective identifier code modulated onto each received light signal including the information borne on the received signal,
   location determining means operable to identify, from amongst the received signals, a particular combination of modulated identifier codes, the location determining means being configured to determine, based on the combination of modulated identifier codes, a neighbourhood in which the device is located.

2. A device in accordance with claim 1 and comprising light emitter information storage means, storing information describing locations of emitters of identifier codes for use by said location determining means.

3. A device in accordance with claim 1 and comprising light emitter information retrieval means, operable to retrieve, from a remote location, identifier codes describing locations of emitters of light signals bearing identifier codes for use by said location determining means.

4. A device in accordance with any claim 1 and wherein said signal detection means comprising correlation means operable to correlate a received light signal with known information sequences to determine the presence or otherwise of one or more of said known information sequences.

5. A device in accordance with claim 4 wherein said location determining means is operable to determine location of said device on the basis of triangulation of three components of said signal, each component being identified by a detected information sequence.

6. A system comprising a device according to claim 1 and a plurality of visible light emitting means, each operable to emit light at least in part in the visible spectrum, and onto which is modulated an identifier code to enable one visible light emitting means to be distinguished from others.

7. A method comprising:
   receiving, on an electronic device, a respective light signal from each one of a plurality of visible light emitting means, each light signal being modulated by an identifier code to enable one visible light emitting means to be distinguished from others;

detecting the identifier code modulated onto each received light signal, identifying, from amongst the received signals, a particular combination of modulated identifier codes, determining, based on the combination of modulated identifier codes, a neighbourhood in which the device is located.

8. A method according to claim 7 comprising emitting from each one of the plurality of visible light emitting means, a respective light signal, each light signal being modulated by an identifier code to enable the visible light emitting means to be distinguished from others.

9. A non-transitory computer readable medium comprising computer executable instructions operable, when executed by a computer will cause the computer to perform a method in accordance with claim 7.

* * * * *